US008130302B2

(12) United States Patent  (10) Patent No.: US 8,130,302 B2
Johnson  (45) Date of Patent: Mar. 6, 2012

(54) METHODS AND APPARATUS PROVIDING SELECTIVE BINNING OF PIXEL CIRCUITS

(75) Inventor: Richard S. Johnson, Boise, ID (US)

(73) Assignee: Aptina Imaging Corporation, George Town (KY)

( * ) Notice: Subject to any disclaimer, the term of this patent is extended or adjusted under 35 U.S.C. 154(b) by 441 days.

(21) Appl. No.: 12/266,965

(22) Filed: Nov. 7, 2008

(65) Prior Publication Data

US 2010/0118167 A1    May 13, 2010

(51) Int. Cl.
  *H04N 3/14*    (2006.01)
  *H04N 5/335*   (2011.01)
  *H01L 27/00*   (2006.01)
(52) U.S. Cl. .................. 348/308; 348/302; 250/208.1
(58) Field of Classification Search ............. 348/308, 348/201, 302, 294
  See application file for complete search history.

(56) References Cited

U.S. PATENT DOCUMENTS

| 6,218,656 | B1 | 4/2001 | Guidash |
| 6,423,994 | B1 | 7/2002 | Guidash |
| 6,657,665 | B1 | 12/2003 | Guidash |
| 6,710,803 | B1* | 3/2004 | Kang ............................. 348/245 |
| 6,878,918 | B2* | 4/2005 | Dosluoglu ................. 250/208.1 |
| 7,193,258 | B2* | 3/2007 | Hara et al. .................... 257/291 |
| 7,244,920 | B2 | 7/2007 | Kim et al. |
| 7,557,846 | B2* | 7/2009 | Ohkawa ......................... 348/302 |
| 7,652,707 | B2* | 1/2010 | Kim et al. ..................... 348/308 |
| 7,705,900 | B2* | 4/2010 | Guidash ........................ 348/308 |
| 7,777,171 | B2* | 8/2010 | Parks ......................... 250/214.1 |
| 7,868,365 | B2* | 1/2011 | Hara et al. .................... 257/291 |
| 7,910,965 | B2* | 3/2011 | Lee et al. ...................... 257/292 |
| 2006/0132633 | A1* | 6/2006 | Nam et al. ..................... 348/308 |
| 2007/0013798 | A1* | 1/2007 | Ahn et al. ...................... 348/308 |
| 2007/0030372 | A1 | 2/2007 | Inagaki et al. |
| 2007/0063127 | A1* | 3/2007 | Bock .......................... 250/208.1 |
| 2007/0158718 | A1* | 7/2007 | Su ................................. 257/296 |
| 2007/0164332 | A1 | 7/2007 | Paik et al. |
| 2008/0018765 | A1 | 1/2008 | Choi et al. |
| 2008/0284882 | A1* | 11/2008 | Mori et al. .................... 348/294 |
| 2009/0046189 | A1* | 2/2009 | Yin et al. ...................... 348/308 |
| 2009/0090845 | A1* | 4/2009 | Yin et al. ................... 250/208.1 |
| 2009/0160990 | A1* | 6/2009 | Johnson ........................ 348/308 |
| 2009/0173974 | A1* | 7/2009 | Shah et al. .................... 257/292 |
| 2009/0237540 | A1* | 9/2009 | Johnson ........................ 348/308 |

FOREIGN PATENT DOCUMENTS

JP      2008060356 A  *  3/2008

* cited by examiner

*Primary Examiner* — John Villecco

(57) ABSTRACT

A pixel circuit configured for optionally connecting the floating diffusion region of the pixel circuit to a floating diffusion region of another pixel circuit. Methods of using the pixel circuit include averaging or summing multiple photosensor outputs in the combined floating diffusion regions, varying the conversion gain of a pixel circuit floating diffusion region, and utilizing multiple readout circuits to readout charges transferred from a single photosensor to the combined floating diffusion regions. A method of window-of-interest averaging that utilizes the combined floating diffusion regions is also disclosed.

36 Claims, 16 Drawing Sheets

US 8,130,302 B2

METHODS AND APPARATUS PROVIDING SELECTIVE BINNING OF PIXEL CIRCUITS

FIELD OF THE INVENTION

This disclosure relates to shared pixel architectures and pixel circuits.

BACKGROUND

Many portable electronic devices such as cameras, cellular telephones, personal digital assistants (PDAs), MP3 players, computers and other devices include an imager for capturing images. One example of an imager is a complementary metal-oxide semiconductor ("CMOS") imager. A CMOS imager includes a focal plane array of pixels, each one of the pixels including at least one photosensor overlying a substrate for accumulating photo-generated charge in the underlying portion of the substrate. Each pixel may include at least one electronic device such as a transistor for transferring charge from the photosensor to a storage region.

Each pixel has corresponding readout circuitry that includes at least a charge storage region connected to the gate of the output transistor, an output source follower transistor, a reset transistor for resetting the charge storage region to a predetermined charge level, and a row control transistor for selectively connecting the readout circuitry to a column line. The charge storage region may be constructed as a floating diffusion region. Each pixel may have independent readout circuitry, or may employ common element pixel architecture (CEPA), that may include multiple pixels sharing a single set of readout circuitry (i.e., a common reset transistor, floating diffusion region, source-follower transistor, and row-select transistor).

A pixel (including any transfer transistor) and corresponding readout circuitry is herein referred to as a "pixel circuit." In a CMOS imager, the active elements of a pixel circuit perform the necessary functions of: (1) photon to charge conversion; (2) accumulation of image charge; (3) resetting the storage region to a known state; (4) transfer of charge to the storage region accompanied by charge amplification; (5) selection of a pixel circuit for readout; and (6) output and amplification of a signal representing a reset level and pixel charge. Photo charge may be amplified when the charge moves from the initial charge accumulation region to the storage region. The charge at the storage region is typically converted to a pixel output voltage by a source follower output transistor.

FIG. 1 illustrates a typical four-transistor (4T) pixel circuit 100 utilized in a pixel array of an imager, such as a CMOS imager. The pixel circuit 100 includes a pixel having a photosensor 101 (e.g., a photodiode) and a transfer transistor 103. Pixel circuit 100 also includes readout circuitry, including a storage region configured as a floating diffusion region FD, a reset transistor 104, a source follower transistor 105, and a row select transistor 106. The at least one photosensor 101 is connected to the floating diffusion region FD by the transfer transistor 103 when the transfer transistor 103 is activated by a transfer control signal TX[n]. The reset transistor 104 is connected between the floating diffusion region FD and an array pixel supply voltage $V_{AA}$. A reset control signal RST[n] is used to activate the reset transistor 104, which resets the floating diffusion region FD to a known state (i.e., to a pre-determined reset voltage corresponding to the array pixel supply voltage $V_{AA}$), as is known in the art.

The source follower transistor 105 has its gate connected to the floating diffusion region FD and is connected between the array pixel supply voltage $V_{AA}$ and the row select transistor 106. The source follower transistor 105 converts the charge stored at the floating diffusion region FD into an electrical output signal. The row select transistor 106 is controllable by a row select signal RS[n] for selectively outputting the output signal $V_{OPIX}$ from the source follower transistor 105 onto column line 107. In a CMOS imager, two output signals are conventionally generated for each pixel circuit 100; one being a reset signal $V_{OPIX\_RST}$ generated after the floating diffusion region FD is reset, the other being an image or photo signal $V_{OPIX\_SIG}$ generated after charges are transferred from the photosensor 101 to the floating diffusion region FD. This process is commonly referred to as "correlated double sampling" or "CDS". Output signals $V_{OPIX\_RST}$, $V_{OPIX\_SIG}$ are selectively stored in a sample and hold circuit 1082 (FIG. 10). Once both signals have been sampled and stored, the photosensor 101 and the floating diffusion region FD are reset by activating both the transfer transistor 103 and the reset transistor 104. Integration of the photosensor 101 begins again when the transfer transistor 103 is at least partially turned off.

FIG. 2. is a schematic diagram of multiple conventional four-transistor (4T) pixel circuits 210, 220, 230 in a segment 200 of a column of a pixel array. Each pixel circuit 210, 220, 230 includes at least one pixel including a photosensor 211, 221, 231 (e.g., a photodiode) with a respective transfer transistor 213, 223, 233. Each pixel circuit 210, 220, 230 also includes respective readout circuitry, including a storage node configured as a floating diffusion region FD1, FD2, FD3, a reset transistor 214, 224, 234, a source follower transistor 215, 225, 235, and a row select transistor 216, 226, 236. The respective output voltages $V_{OPIX}[n-1]$, $V_{OPIX}[n]$, $V_{OPIX}[n+1]$ (which should be understood to be either the output reset voltages $V_{OPIX\_RST}[n-1]$, $V_{OPIX\_RST}[n]$, $V_{OPIX\_RST}[n+1]$ or the output signal voltages $V_{OPIX\_SIG}[n-1]$, $V_{OPIX\_SIG}[n]$, $V_{OPIX\_SIG}[n+1]$) for pixel circuits 210, 220, 230 are selectively output by their respective row select transistors 216, 226, 236 onto column line 207.

Each pixel circuit 210, 220, 230 receives a reset signal (RST[n-1], RST[n], RST[n+1], respectively), a transfer signal (TX[n-1], TX[n], TX[n+1], respectively), and a row select signal (RS[n-1], RS[n], RS[n+1], respectively). While each pixel circuit 210, 220, 230 in segment 200 is shown with a single photosensor 211, 221, 231, respectively, it should be understood that pixel circuits in a pixel array may employ a common element pixel architecture (CEPA), where multiple pixels share a single set of readout circuitry (i.e., a common reset transistor, floating diffusion region, source-follower transistor, and row-select transistor).

It may be desirable to electrically connect floating diffusion regions of multiple pixel circuits (also known as "binning" the pixel circuits). For example, summation or averaging of charges generated at each pixel circuit can be used in operation of the pixel array for many purposes, such as calibration, testing, and camera settings for various exposure conditions. Such operations, however, are typically conducted in the digital domain after conversion of each output signal $V_{OPIX}$ from the desired set of pixel circuits. This requires significant processing resources, resulting in decreased speed of such operations and increased power usage of the pixel array. It is therefore desirable for a pixel array to provide for summation or averaging of charges in the analog domain.

Furthermore, referring back to FIG. 1, the maximum amount of charge able to be stored at the floating diffusion region FD is determinative of a conversion gain of the pixel circuit 100. The conversion gain is the ratio of output voltage $V_{OPIX}$ to charge stored at the floating diffusion region FD. If the floating diffusion region FD has low capacitance, meaning that a small amount of charge may be stored in the floating diffusion region FD, the conversion gain is high. A high conversion gain is preferable for low-light conditions. However, for brighter conditions, a low conversion gain is preferred. A low conversion gain may occur when the floating diffusion region FD has high capacitance and can thus store a larger amount of charge. Because the pixel circuit 100 may be used in both low and bright light situations, a variable conversion gain for the pixel circuit 100 is desirable.

It may be desirable to perform the functions described above only at select times of operating a pixel array. Additionally, it is advantageous to use identical pixel circuits in a pixel array, yet it may be desirable to bin the floating diffusion regions of only certain subsets of pixel circuits in the pixel array. Accordingly, it is desirable for a pixel array to provide for selective binning of the floating diffusion regions.

While techniques of selectively binning pixels are known in the art, these techniques require the addition of another transistor to selectively combine the floating diffusion regions. See Guidash, U.S. Published Patent Application 2006/0274176 A1. The addition of transistors to the readout circuitry architecture, however, decreases the percentage of pixel circuit area that can be devoted to the photosensor (or photosensors). This percentage is also known as the "fill factor" of the pixel circuit. A reduced fill factor adversely affects the charge capacity and dynamic range of the pixel circuit. Accordingly, it is desirable for a pixel array to provide for selective combination of the floating diffusion regions without the addition of transistors to the pixel circuit architecture.

DETAILED DESCRIPTION OF THE INVENTION

Embodiments disclosed herein provide a four-transistor (4T) pixel circuit, where the readout circuitry includes a reset transistor used to reset the floating diffusion region which is also connected to the floating diffusion of another pixel circuit, allowing for the optional connecting of floating diffusion regions of neighboring pixel circuits.

Figure 1:
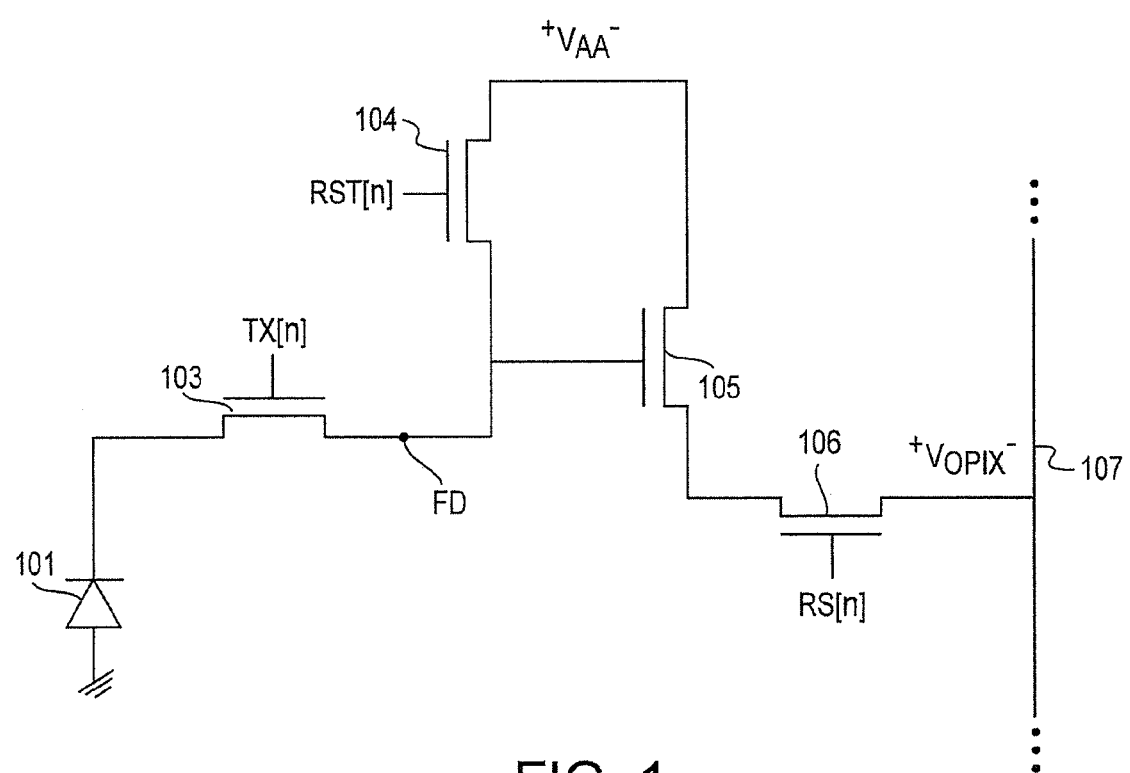
FIG. 1 is a schematic diagram of a conventional four-transistor (4T) pixel circuit.
Figure 2:
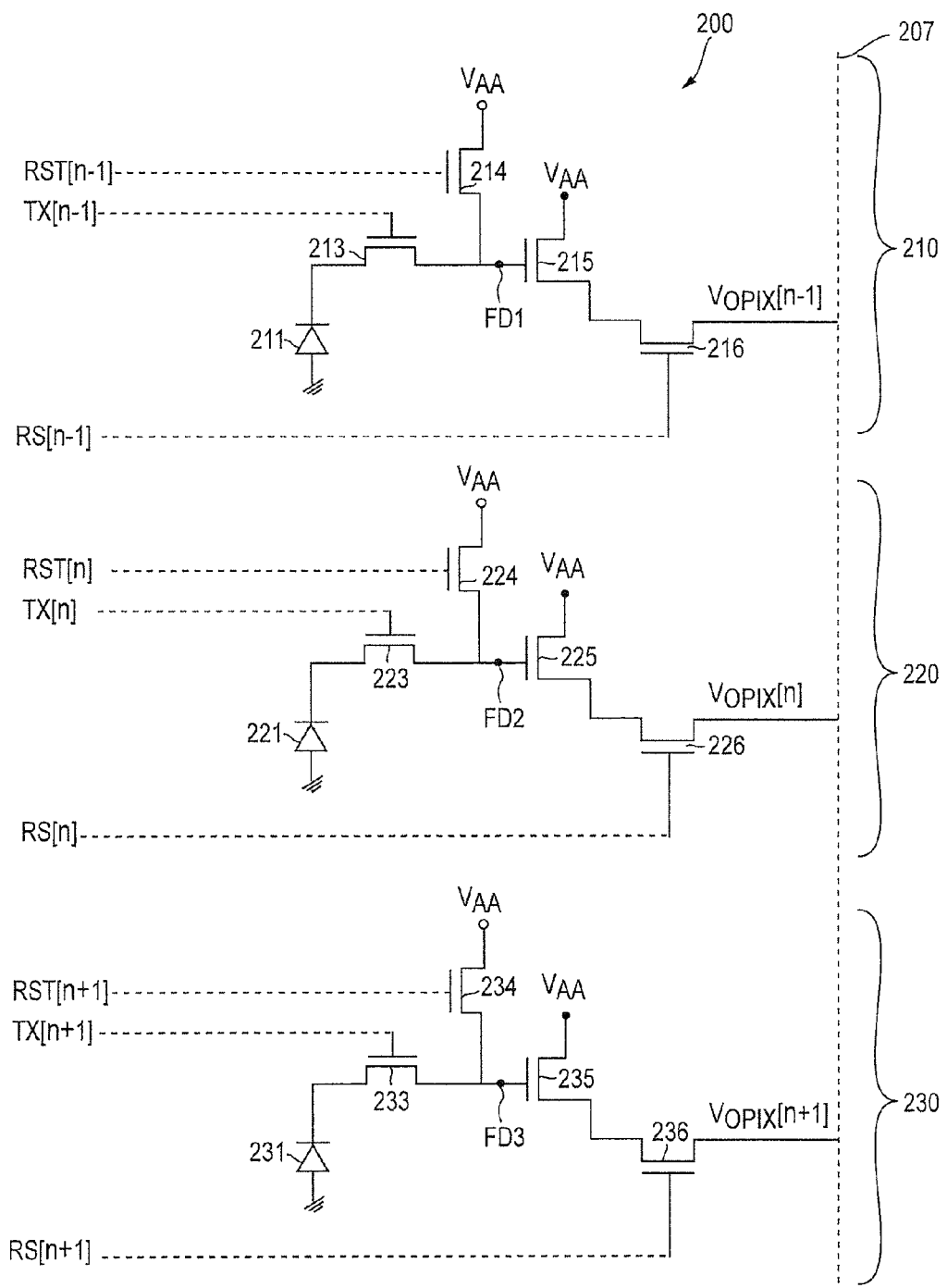
FIG. 2. is a schematic diagram of multiple conventional four-transistor (4T) pixel circuits in a pixel array.
Figure 3:
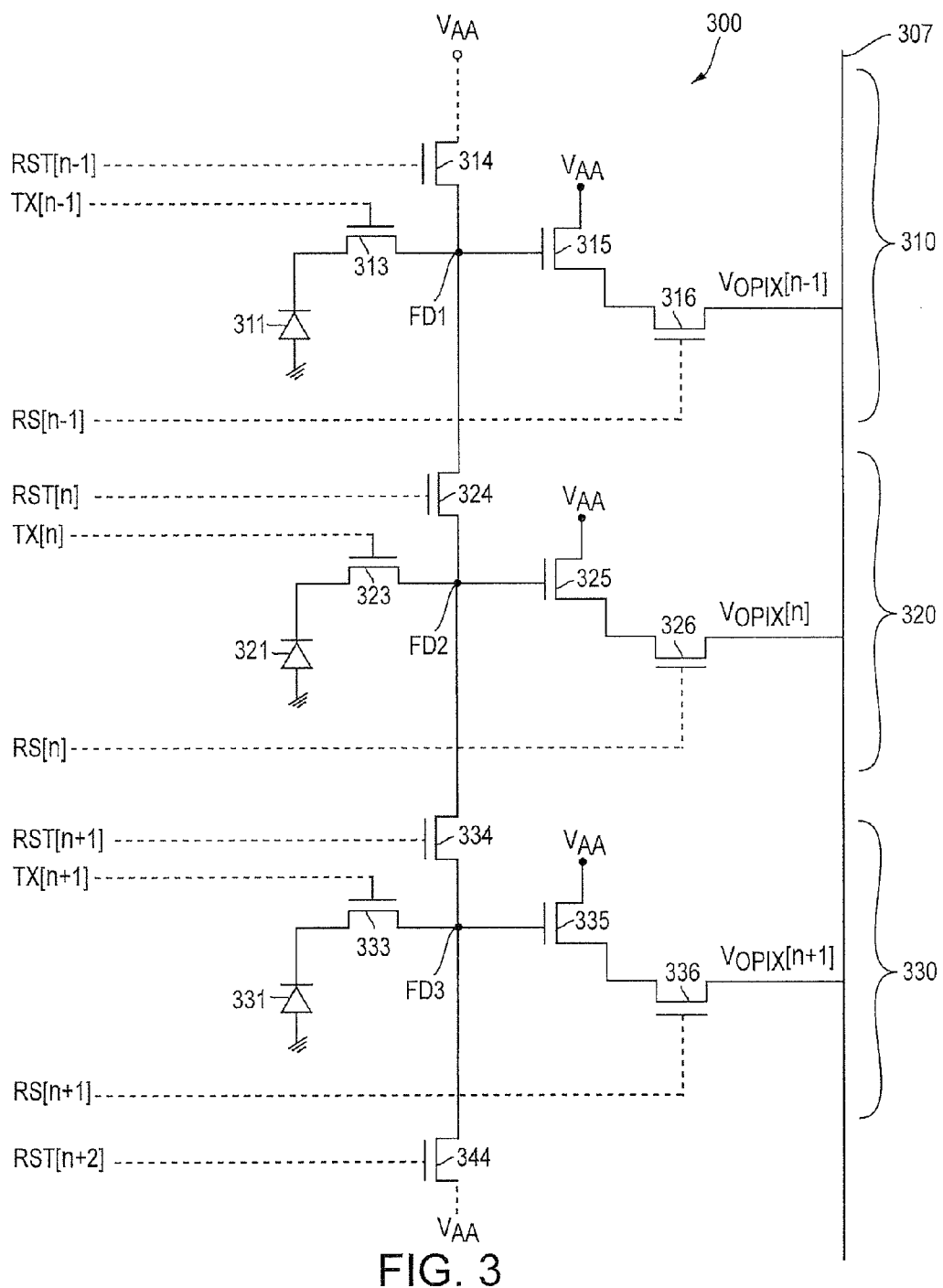
FIG. 3 is a schematic diagram of multiple four-transistor (4T) pixel circuits in a pixel array, according to disclosed embodiments.

FIG. 3 is a schematic diagram of multiple four-transistor (4T) pixel circuits 310, 320, 330 in a segment 300 of a pixel array column, according to disclosed embodiments. Pixel circuits 310, 320, 330 are similar to pixel circuits 210, 220, 230 of FIG. 2; however, as is explained below, storage regions of each pixel circuit 310, 320, 330 may be electrically connected to the storage regions of another pixel circuit in the pixel array column via the pixel circuit's reset transistor 314, 324, 334, respectively.

As shown in FIG. 3, pixel circuits 310, 320, 330 each respectively include a pixel with a photosensor 311, 321, 331 coupled to the respective readout circuitry's storage regions, which are configured as floating diffusion regions FD1, FD2, FD3, via a transfer transistor 313, 323, 333. The photosensors 311, 321, 331 are connected to the respective floating diffusion regions FD1, FD2, FD3 when the respective transfer transistors 313, 323, 333 are activated by transfer control signals TX[n−1], TX[n], TX[n+1].

Each pixel circuit 310, 320, 330 has a floating diffusion region FD1, FD2, FD3 coupled to the drain of the associated reset transistor 314, 324, 334. Reset transistor 344, controlled by reset signal RST[n+2], represents the reset transistor of a subsequent pixel circuit (not shown) in the column. The source of each reset transistor 314, 324, 334 is coupled to a floating diffusion region of another pixel circuit. The reset transistors 314, 324, 334 are coupled to an array pixel supply voltage $V_{AA}$ at the top and bottom of each column of the pixel array, such that when all reset transistors in the column of the pixel array are activated, the floating diffusion regions FD1, FD2, FD3 are reset to a known state (e.g., to a predetermined reset voltage corresponding to the array pixel supply voltage $V_{AA}$).

Each floating diffusion region FD1, FD2, FD3 is coupled at the gate of a respective source-follower transistor 315, 325, 335. The source follower transistors 315, 325, 335 are connected between the array pixel supply voltage $V_{AA}$ and the respective row select transistors 316, 326, 336. The source follower transistors 315, 325, 335 convert the charge stored at the respective floating diffusion regions FD1, FD2, FD3 into an electrical output signal. The row select transistors 316, 326, 336 are controllable by row select signals RS[n−1], RS[n], RS[n+1] for selectively outputting the output signals $V_{OPIX}[n-1]$, $V_{OPIX}[n]$, $V_{OPIX}[n+1]$ (which should be understood to include either the respective output reset voltages or respective output signal voltages) from the source follower transistors 315, 325, 335 onto column line 307.

Figure 4A:
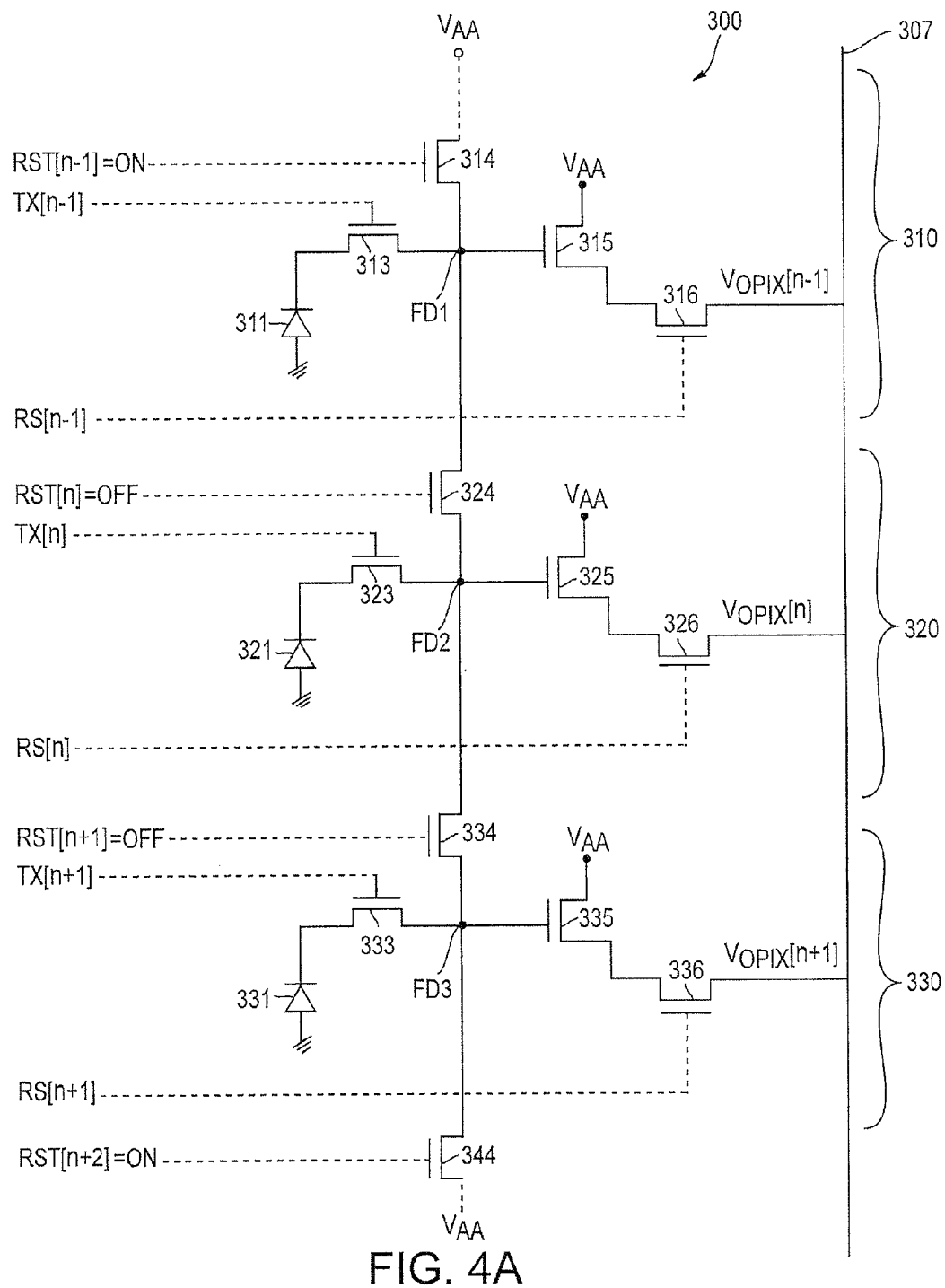
FIG. 4A is a schematic diagram of pixel circuits in a pixel array configured to provide normal non-binning operation, according to disclosed embodiments.
Figure 4B:
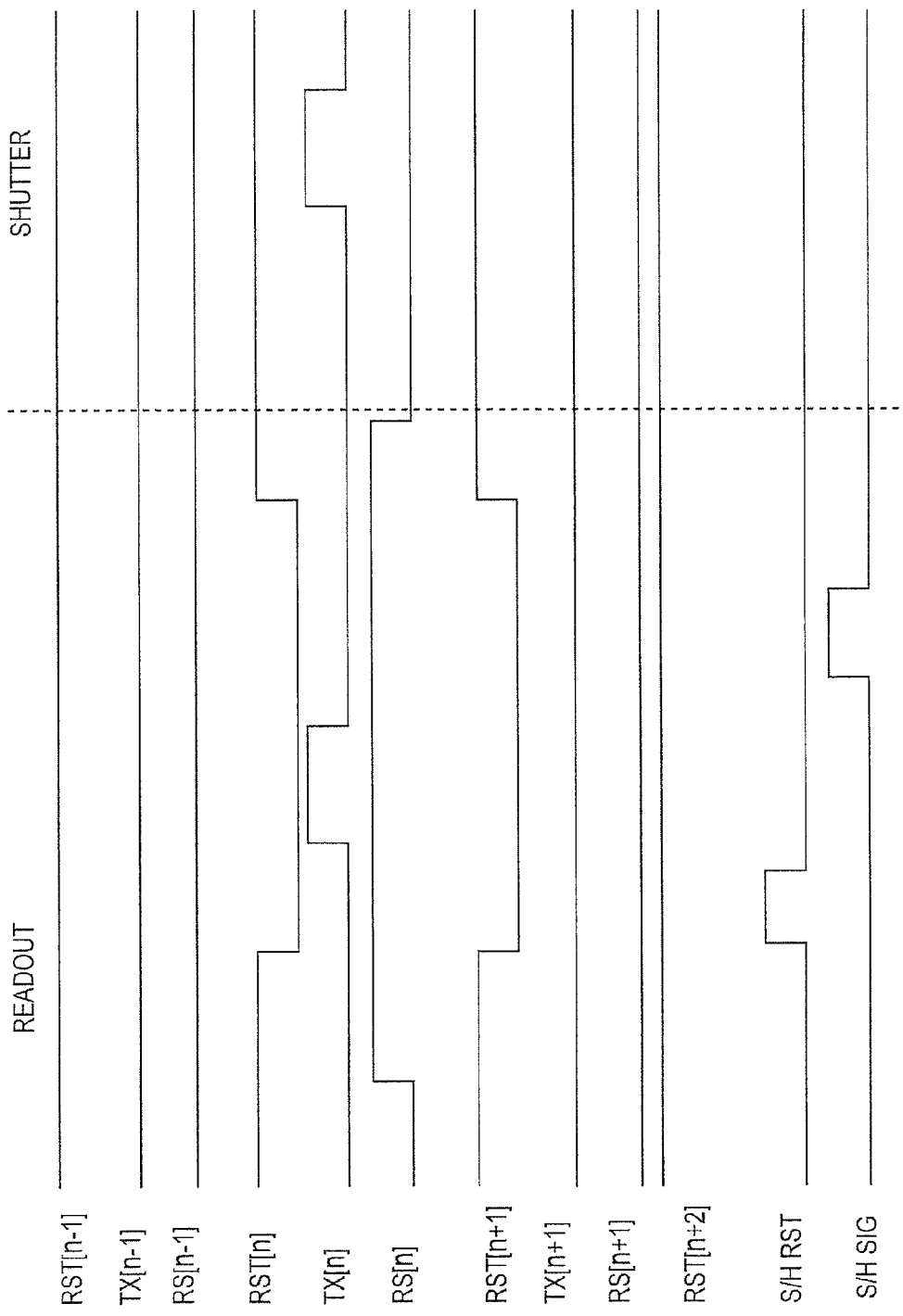
FIG. 4B is a timing diagram illustrating the timing of signals in the non-binning operation provided in FIG. 4A.

FIG. 4A is a schematic diagram of the pixel circuits 310, 320, 330 in the segment 300 of the pixel array shown in FIG. 3 configured to provide normal non-binning operation of pixel circuit 320. FIG. 4B is a timing diagram of signals received during readout and shutter periods of pixel circuits 310, 320, 330 in segment 300, for providing normal non-binning operation of segment 300 illustrated in FIG. 4A.

The row of pixels (row 'n') including pixel circuit 320 on the pixel array is selected by setting row select signal RS[n] high. The floating diffusion regions of all pixel circuits in the column of the pixel array are reset to a predetermined reset voltage corresponding to the array pixel supply voltage $V_{AA}$ by activating all reset transistors in the column (illustrated in FIG. 4B by setting all reset signals RST[n−1], RST[n], RST[n+1], RST[n+2] to a logical high). The output reset voltage $V_{OPIX\_RST}$ for row n is read out via column line 307 and stored by a sample and hold circuit 1082 (FIG. 10), when sample and hold reset control signal S/H Rst is pulsed.

The floating diffusion region FD2 of pixel circuit 320 is then isolated from the array pixel supply voltage $V_{AA}$ by deactivating the adjacent reset transistors 324, 334; i.e., by setting the corresponding reset signals RST[n], RST[n+1] low (shown as "Off" in FIG. 4A). Other reset signals RST[n−1], RST[n+2] may remain high (shown as "On" in FIG. 4A). During an integration period, photosensor 321 of pixel circuit 320 accumulates photo-generated charge according to received incident light. At the end of the integration period, the accumulated photo-generated charge is transferred to the floating diffusion region FD2 via transfer transistor 323 when transfer signal TX[n] is pulsed. The output signal voltage $V_{OPIX\_SIG}$ for row N is read out and stored by the sample and hold circuit 1082 (FIG. 10) when sample and hold signal control signal S/H Sig is pulsed. Reset transistors 324, 334 are then activated by setting reset signals RST[n], RST[n+1] high.

Figure 5A:
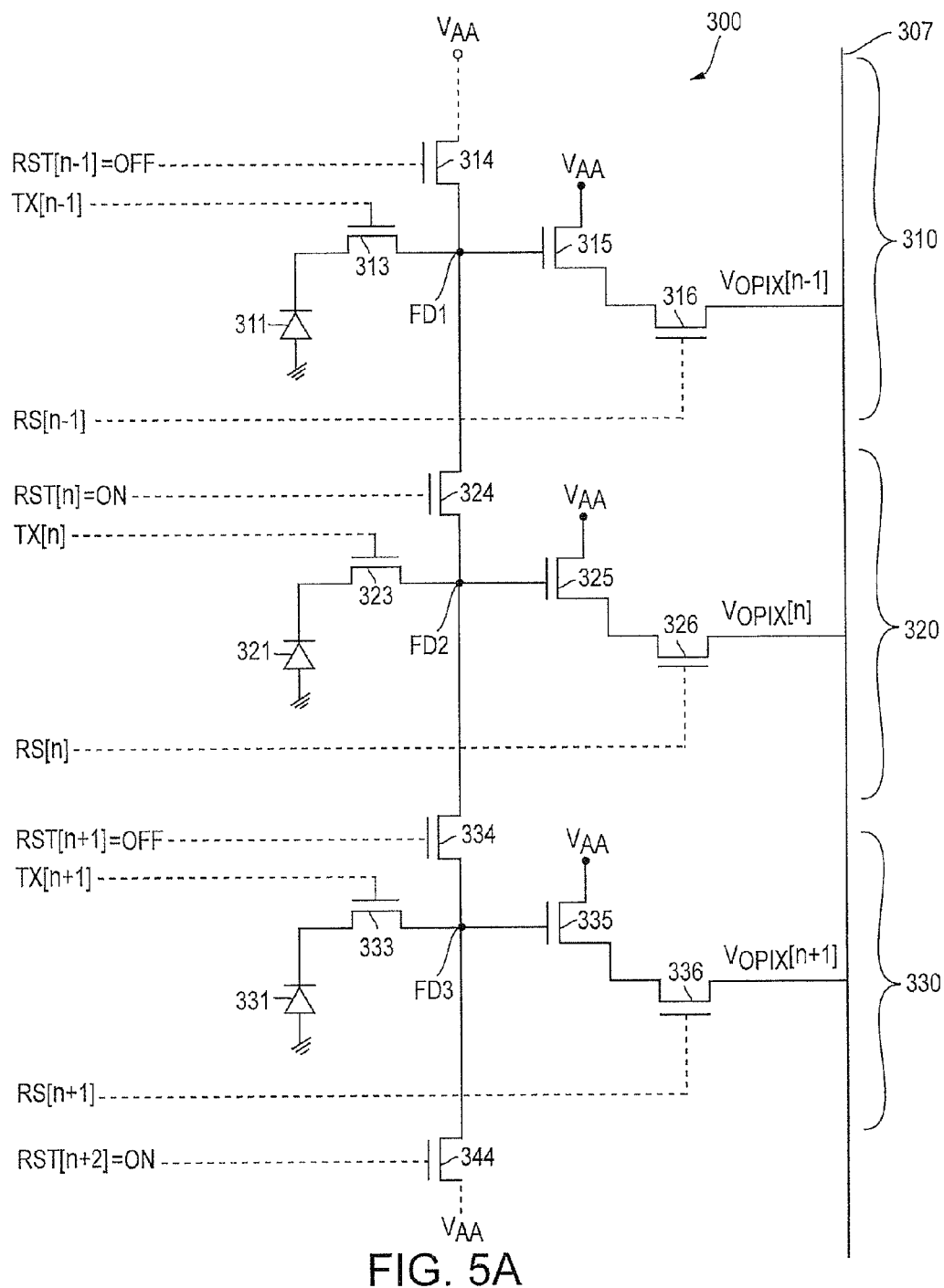
FIG. 5A is a schematic diagram of pixel circuits in a pixel array configured to provide 2×1 vertical binning operation, according to disclosed embodiments.
Figure 5B:
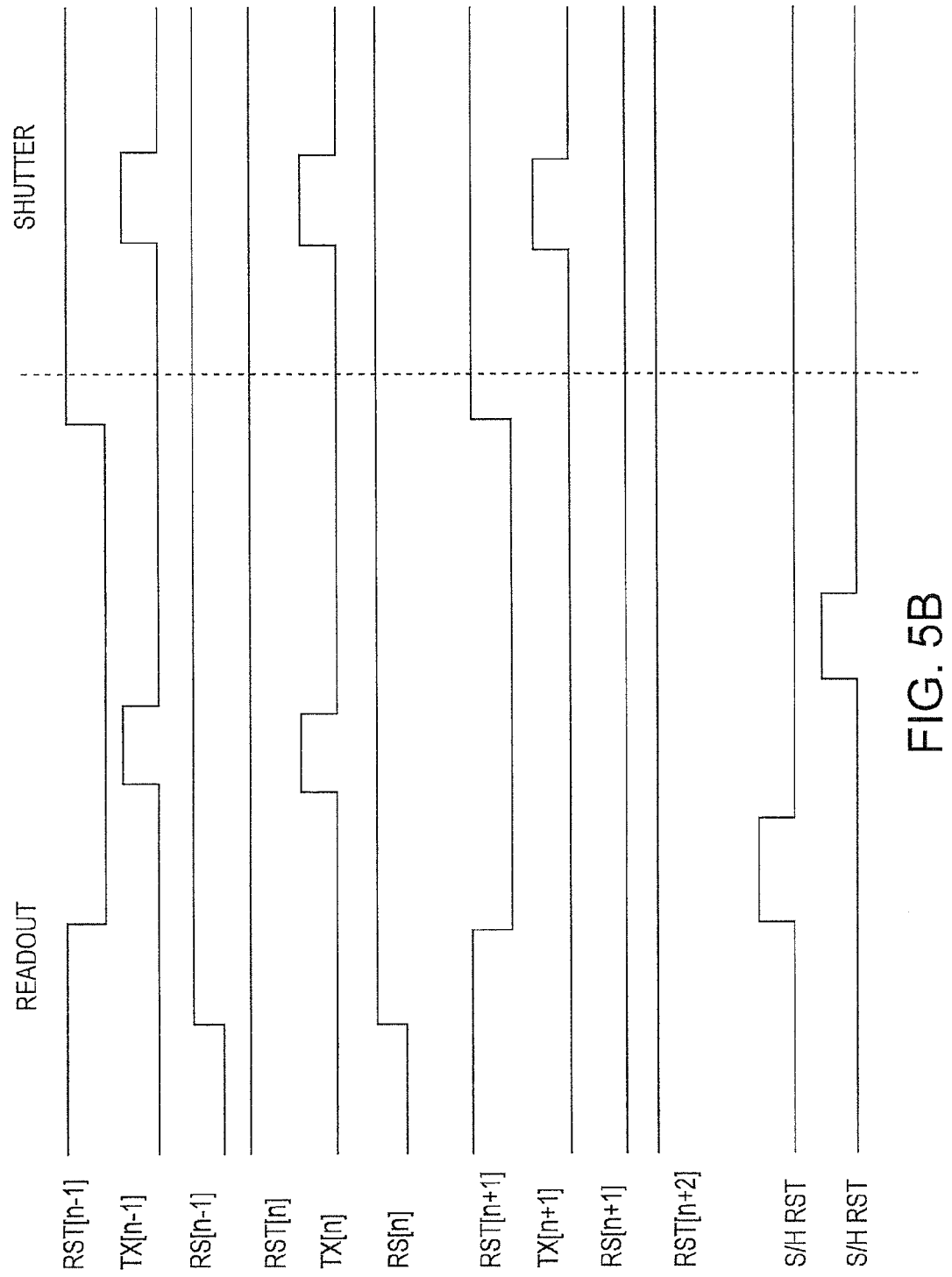
FIG. 5B is a timing diagram illustrating the timing of signals in the 2×1 vertical binning operation provided in FIG. 5A.

FIG. 5A is a schematic diagram of the pixel circuits 310, 320, 330 in the segment 300 configured to provide vertical binning operation of the floating diffusion region FD2 of pixel circuit 320 with the adjacent floating diffusion region FD1 of pixel circuit 310 (referred to as 2×1 vertical binning). FIG. 5B is a timing diagram of signals received during readout and shutter periods of pixel circuits 310, 320, 330 in segment 300, for providing vertical binning operation of the floating diffusion regions FD2, FD1 of segment 300 illustrated in FIG. 5A.

To provide 2×1 vertical binning, the pixel circuits 310, 320, 330 of the illustrated segment 300 of the pixel array are operated differently from the non-binning operation shown in FIGS. 4A-4B. Unlike in non-binning operation, the reset transistor 324 of pixel circuit 320 remains activated by maintaining reset signal RST[n] high (shown as "On" in FIG. 5A). Reset transistors 314, 334 are deactivated by setting RST[n+1], RST[n−1] low (shown as "Off") to isolate the combined floating diffusion regions FD1, FD2 from the array pixel supply voltage $V_{AA}$. The floating diffusion region FD2 of pixel circuit 320 is thus electrically connected to the floating diffusion region FD1 of pixel circuit 310 via reset transistor 324.

The timing diagram of FIG. 5B shows signals configured to provide summing of the photo-generated charges generated on photosensors 311 and 321. In FIG. 5B, the rows of pixel circuits that include pixel circuits 320 and 310 on the pixel array are selected by setting row select signals RS[n], RS[n−1] high (shown as "On" in FIG. 5A). The photo-generated charges are transferred from photosensors 321, 311 via transfer transistors 323, 313 and distributed between the electrically connected floating diffusion regions FD2, FD1. The charges stored in the floating diffusion regions FD2, FD1 are output via the source-follower transistors 325, 315 and the activated row-select transistors 326, 316 as the combination output signal voltages $V_{OPIX\_SIG}[n]$, $V_{OPIX\_SIG}[n-1]$, and read out via column line 307 as a summation of output signal voltages $V_{OPIX\_SIG}[n]$, $V_{OPIX\_SIG}[n-1]$. The output is stored by the sample and hold circuit 1082 (FIG. 10) when sample and hold control signal S/H Sig is pulsed. Reset transistors 324, 334 are thereafter activated according to reset signals RST[n], RST[n+1], and the column of pixel circuits reset.

Alternatively, segment 300 of the pixel array can be operated to provide averaging of the photo-generated charges generated on photosensors 311 and 321. This is accomplished by not providing a high row select signal RS[n−1] to row select transistor 316 of pixel circuit 310. Thus, the charges from photosensors 321 and 311 will be divided between electrically connected floating diffusion regions FD2, FD1, and only the average (i.e., one half of the sum of the charges stored at floating diffusion regions FD2, FD1) is output via source-follower transistor 325 onto column line 307.

Alternatively, segment 300 of the pixel array can be operated to provide a programmable conversion gain through the 2×1 binning operation of floating diffusion regions FD2, FD1. Conversion gain of pixel circuit 320 can be decreased by increasing the capacitance of the floating diffusion region FD2 by binning floating diffusion region FD2 with adjacent floating diffusion region FD1. The floating diffusion regions FD2, FD1 are electrically connected via reset transistor 324, as discussed above. However, the transfer transistor 313 of pixel circuit 310 remains deactivated (i.e., by keeping TX[n−1] low in FIG. 5B), and only the photo-generated charge from photosensor 321 of pixel circuit 320 is distributed across electrically connected floating diffusion regions FD2, FD1, and output via source-follower transistors 315, 325. Thus, the conversion gain of pixel circuit 320 (i.e., the ratio of output voltage $V_{OPIX}[n]$ to charge stored at the floating diffusion region FD2) is reduced.

Figure 6A:
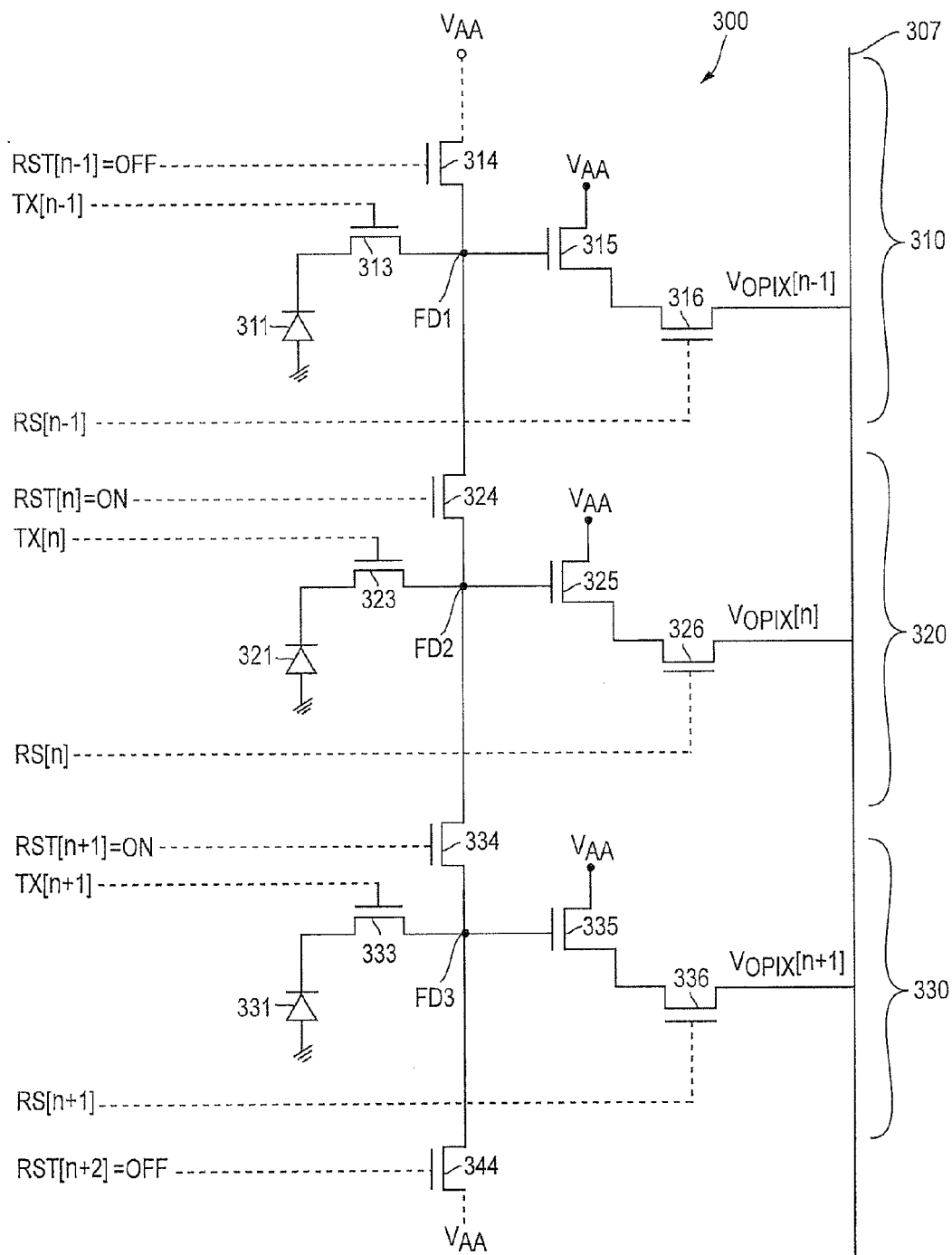
FIG. 6A is a schematic diagram of pixel circuits in a pixel array configured to provide 3×1 vertical binning operation, according to disclosed embodiments.
Figure 6B:
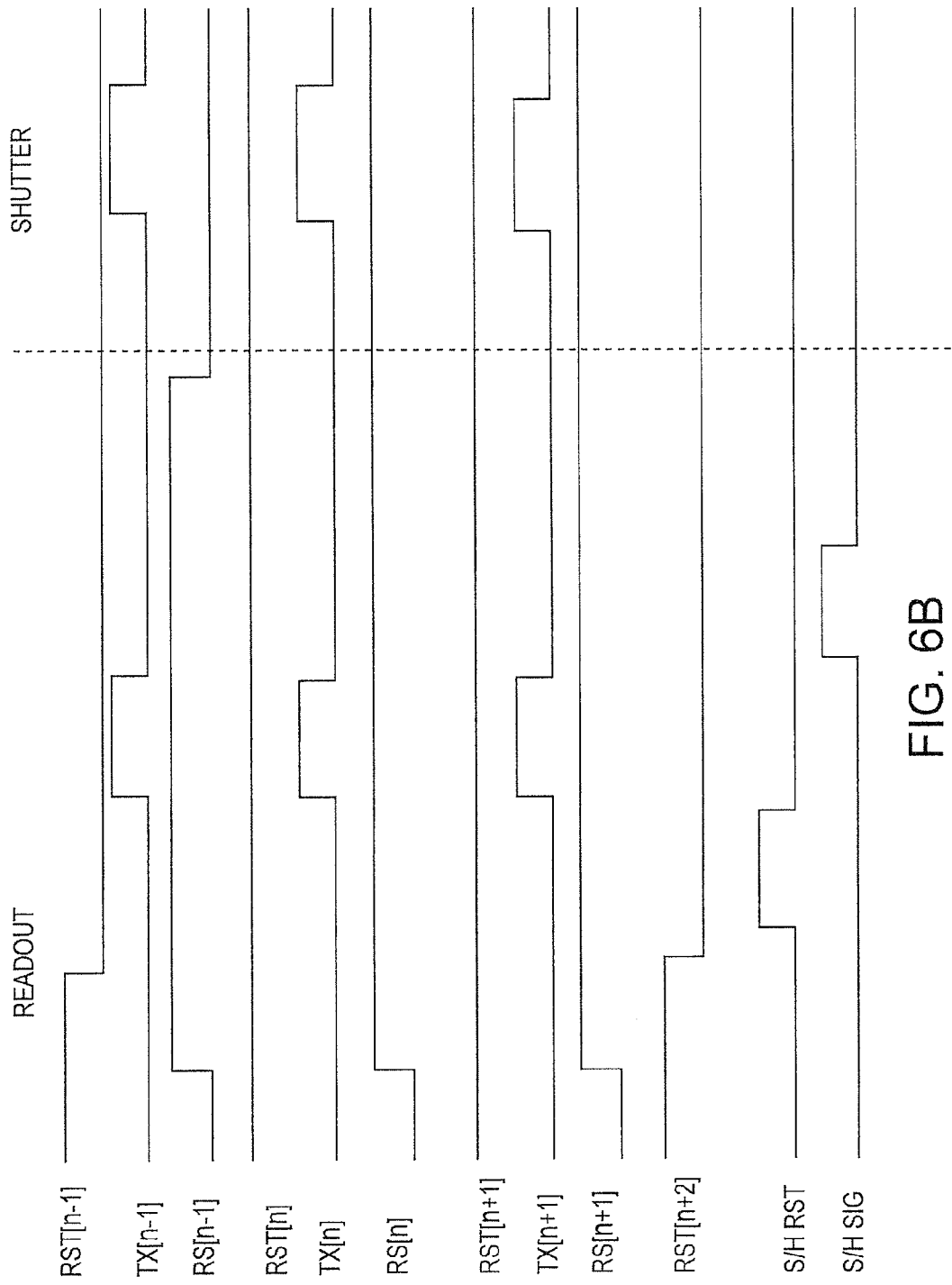
FIG. 6B is a timing diagram illustrating the timing of signals in the 3×1 vertical binning operation provided in FIG. 6A.

FIG. 6A is a schematic diagram of the pixel circuits 310, 320, 330 in the segment 300 of the pixel array shown in FIG. 3 configured to provide vertical binning of the floating diffusion region FD2 of pixel circuit 320 with adjacent floating diffusion regions FD1, FD3 of pixel circuits 310, 330 (referred to as 3×1 vertical binning). FIG. 6B is a timing diagram of signals received during readout and shutter periods of pixel circuits 310, 320, 330 in segment 300, for providing 3×1 vertical binning operation of the floating diffusion regions FD1, FD2, FD3 in segment 300 illustrated in FIG. 6A.

To provide 3×1 vertical binning, the pixel circuits 310, 320, 330 of the illustrated segment 300 are operated similar to the 2×1 vertical binning operation shown in FIGS. 5A-5B. However, both reset transistors 324, 334 of pixel circuits 320, 330 remain activated by maintaining reset signals RST[n], RST[n+1] high (shown as "On" in FIG. 6A). Reset transistors 314, 344 are deactivated by setting reset signals RST[n−1], RST[n+2] low (shown as "Off" in FIG. 6A) to isolate the combined floating diffusion regions FD1, FD2, FD3 from the array pixel supply voltage $V_{AA}$. The floating diffusion region FD2 of pixel circuit 320 is thus electrically connected to floating diffusion regions FD1, FD3 of pixel circuits 310, 330 via reset transistors 324, 334.

Through 3×1 vertical binning, summing of photo-generated charges on photosensors 311, 321, 331 (by transferring charges from photodiodes 311, 321, 331, as shown in FIG. 6B), averaging of photo-generated charges on photosensors 311, 321, 331 (by not providing high row select signals RS[n−1], RS[n+1] to row select transistors 316, 336 in FIG. 6B), or programmable conversion gain of pixel circuit 320 (by keeping TX[n−1], TX[n+1] low in FIG. 6B) can be accomplished in accord with the respective operations described above with regard to 2×1 vertical binning.

When summing or averaging of photo-generated charges is performed through vertical binning of one or more floating diffusion regions via reset transistors, the total capacitance of the combined floating diffusion regions includes the capacitance of the electrically connecting reset transistor. Thus, the respective conversion gains of pixel circuits with electrically connected floating diffusion regions are reduced. This decreased conversion gain can result in less accurate representation of the photo-generated charges.

Figure 7A:
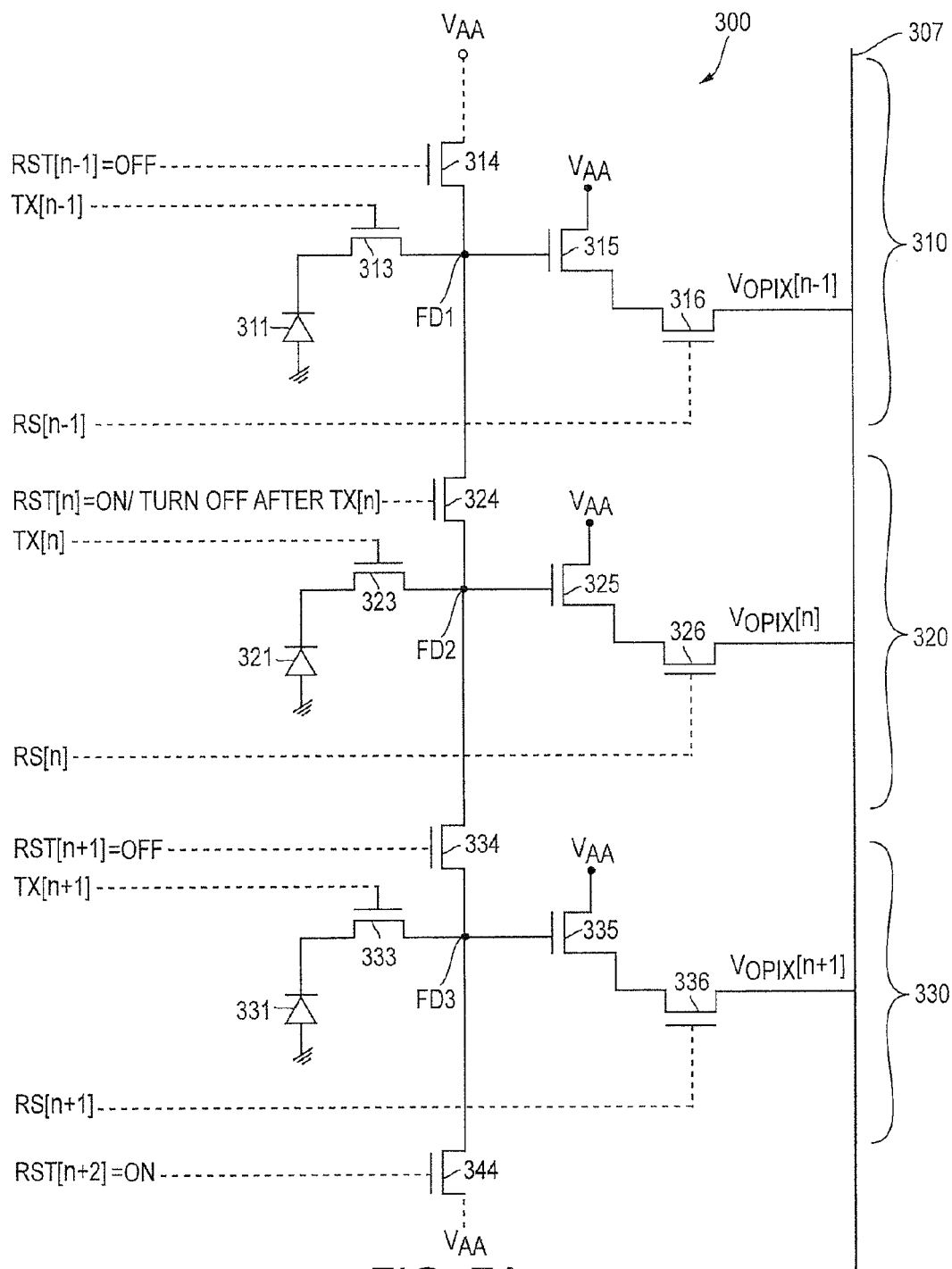
FIG. 7A is a schematic diagram of pixel circuits in a pixel array configured to provide 2×1 vertical binning operation with increased conversion gain, according to disclosed embodiments.
Figure 7B:
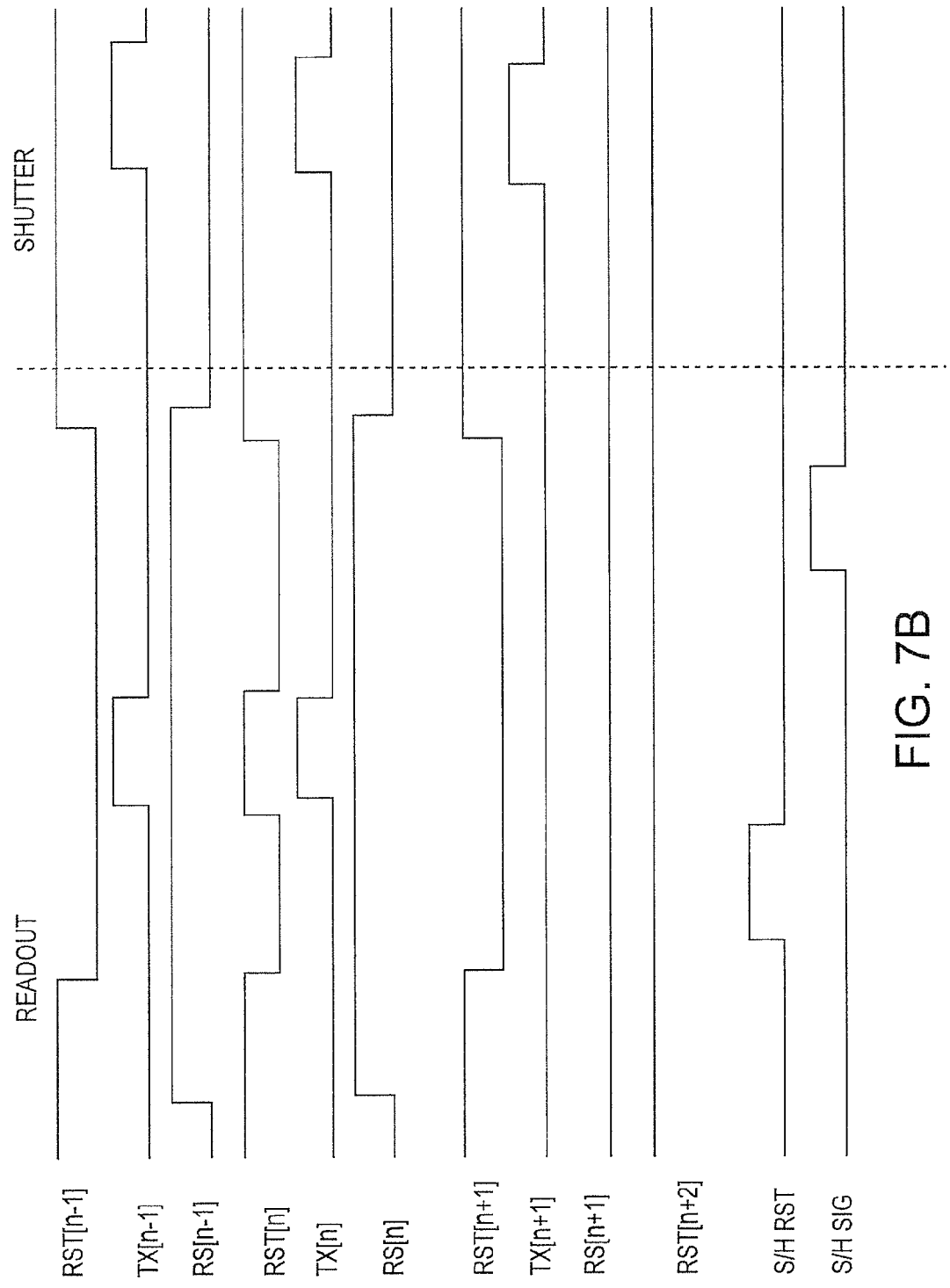
FIG. 7B is a timing diagram illustrating the timing of signals in the 2×1 vertical binning operation with increased conversion gain provided in FIG. 7A.

FIG. 7A is a schematic diagram of the pixel circuits 310, 320, 330 in the segment 300 of the pixel array shown in FIG. 3 configured to provide summing of the photo-generated charges generated on photosensors 311, 321 through 2×1 vertical binning operation similar to that described with regard to FIGS. 5A-5B. However, the operation shown in FIG. 7A mitigates the reduction of conversion gain caused by the added capacitance of reset transistor 321. FIG. 7B is a timing diagram of signals received during readout and shutter periods of pixel circuits 310, 320, 330 in segment 300, for providing 2×1 vertical binning operation of the floating diffusion regions FD2, FD1 in segment 300 illustrated in FIG. 7B.

The operation of the segment 300 of the pixel array shown in FIGS. 7A-7B is initially similar to that shown in FIGS. 5A-5B. Reset transistor 324 remains activated by maintaining RST[n] high (shown initially as "On" in FIG. 7A) while charges from photosensor 321 and/or photosensor 311 are transferred via the respective transfer transistors 313, 323 by pulsing transfer signals TX[n], TX[n−1]. However, unlike the operation of pixel segment shown in FIGS. 5A-5B, reset transistor 324 is deactivated by setting reset signal RST[n] low (shown as "Turn Off After TX[n]" in FIG. 7A) after the photo-generated charges from photosensors 321, 311 are transferred to the electrically connected floating diffusion regions FD2, FD1 and divided between the electrically connected floating diffusion regions FD2, FD1. Thus, the voltage drop across reset transistor 324 is eliminated, and the reduction in conversion gain is mitigated. It should be understood that this method of mitigating the reduction in conversion gain can also be applied when the segment 300 is operated to provide averaging of photo-generated charges as well as summing.

While FIGS. 4A-7B show a segment 300 of a pixel array with each pixel circuit having a single pixel and an associated readout circuitry, it should be understood that the apparatus and methods described above can apply to pixels sharing common readout circuits, known as common element pixel architecture (CEPA). In a pixel array configured with shared readout circuitry, each photosensor of a respective pixel may be on a different row within a single column of the pixel array.

Figure 8:
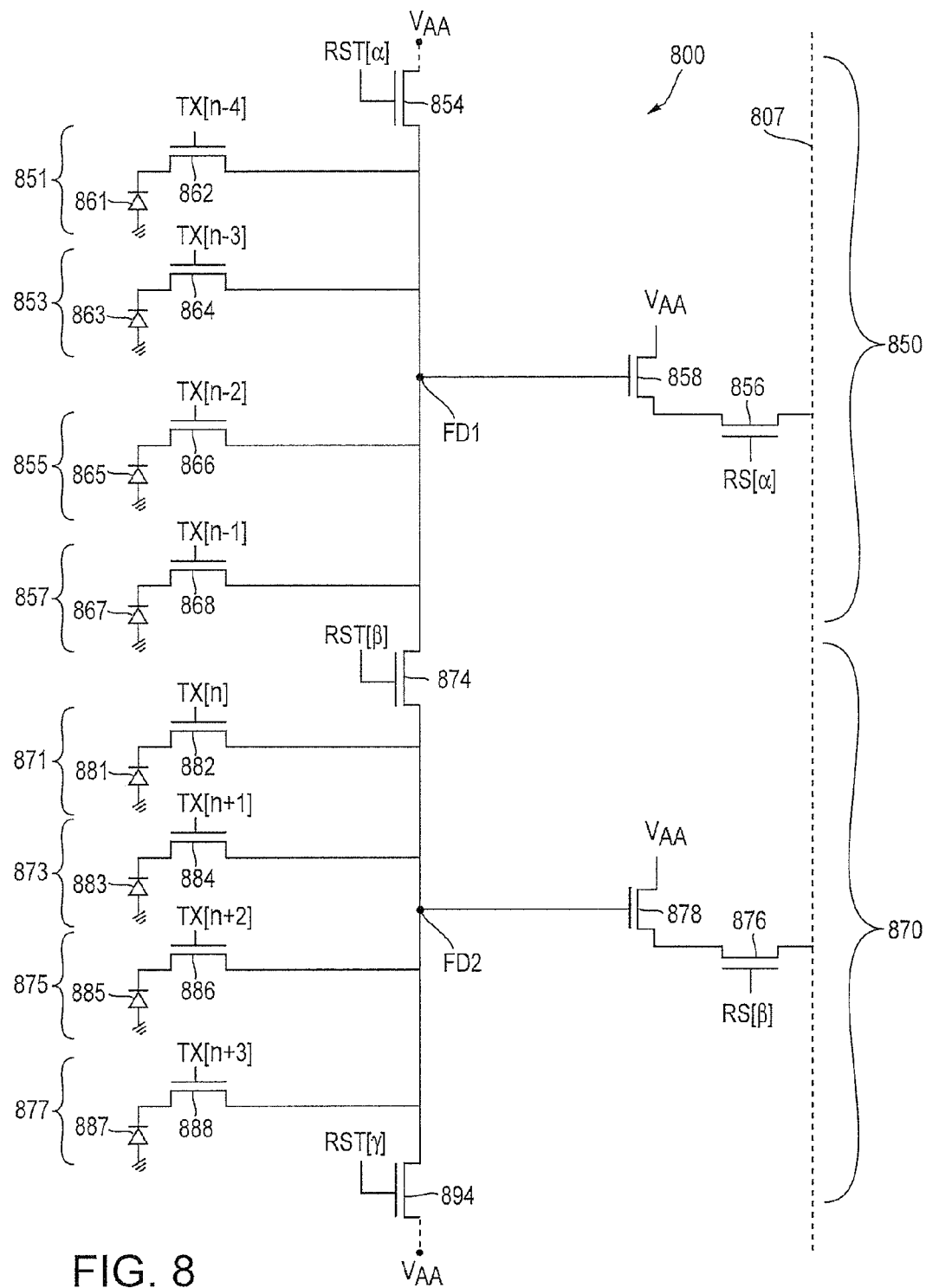
FIG. 8 is a schematic diagram of pixels in a pixel array employing common element pixel architecture (CEPA), according to disclosed embodiments.

FIG. 8 is a schematic diagram of a segment 800 of a pixel array. Eight pixels 851, 853, 855, 857, 871, 873, 875, 877 are shown in the segment. Each pixel has a respective photosensor 861, 863, 865, 867, 881, 883, 885, 887 and transfer transistor 862, 864, 866, 868, 882, 884, 886, 888 controlled by transfer signals TX[n−4], TX[n−3], TX[n−2], TX[n−1], TX[n], TX[n+1], TX[n+2], TX[n+3], respectively. Pixels 851, 853, 855, 857 are grouped together as a pixel circuit 850, sharing a common readout circuitry that includes a storage region configured as floating diffusion region FD11, reset transistor 854 controlled by reset signal RST[α], source follower transistor 858, and row-select transistor 856 controlled by RS[α]. Pixels 871, 873, 875, 877 are similarly grouped together as a pixel circuit 870, sharing a common readout circuitry that includes a storage region configured as floating diffusion region FD21, reset transistor 874 controlled by reset signal RST[β], source follower transistor 878, and row-select transistor 876 controlled by RS[β]. Reset transistor 894, controlled by reset signal RST[γ], represents the reset transistor of a subsequent pixel circuit (not shown) in the column. Reset transistors 854, 874, 894 are coupled to array pixel supply voltage $V_{AA}$ at the top and bottom of each column of the pixel array, such that when all reset transistors in the column of the pixel array are activated, the floating diffusion regions FD11, FD21 are reset to a known state (e.g., to a predetermined reset voltage corresponding to the array pixel supply voltage $V_{AA}$).

While the segment 800 of a pixel array shown in FIG. 8 includes four pixels sharing a common readout circuitry, it should be understood that other embodiments may include readout circuitry shared by other number of pixels. Each pixel configured to share a common readout circuit may receive incident light filtered for different colors or the same color, or a plurality of pixels sharing readout circuitry may receive incident light filtered for a first color, while another plurality of pixels sharing the same readout circuitry may receive incident light filtered for a second color. Alternatively, the pixels may not be filtered for colored light at all.

The methods of vertical binning described above with respect to FIGS. 4A-7B can be applied to a pixel array having pixels configured to share common readout circuitry, as shown in FIG. 8. For example, 2×1 vertical binning can be accomplished through operation similar to that described with regard to FIGS. 5A-5B, with floating diffusion regions FD11, FD21 switchably connected via reset transistor 874 by maintaining reset signal RST[β] high, and isolated from array pixel supply voltage $V_{AA}$ via reset transistors 854, 894 by setting reset signals RST[a], RST[γ] low.

The appropriate transfer transistors 862, 864, 866, 868, 882, 884, 886, 888 for the associated photosensors 861, 863, 865, 867, 881, 883, 885, 887 from which charge transfer are desired are activated by pulsing their respective transfer signals. For example, to provide averaging of pixels 851 and 871 (which may be filtered for the same or different colored incident light) transfer transistors 862 and 882 are activated by pulsing transfer signals TX[n−4] and TX[n]. The photo-generated charges from photosensors 861 and 881 are distributed between the electrically connected floating diffusion regions FD11, FD21. The charges stored in the floating diffusion regions FD11, FD21 are output via the source-follower transistors 855, 875 and the activated row-select transistors 856, 876 as the combination output signal voltages $V_{OPIX\_SIG}[n-4]$, $V_{OPIX\_SIG}[n]$, and read out via column line 807 as a summation of output signal voltages $V_{OPIX\_SIG}[n-4]$, $V_{OPIX\_SIG}[n]$.

Variable conversion gain may be performed on photo-generated charges generated by at least one photosensor from either pixel circuit 850, 870, in a manner similar to that described with regard to FIGS. 7A-7B. Summing or averaging may be performed on charges generated by a plurality of photosensors from either pixel circuit 850, 870, as described above with regard to FIGS. 5A-7B. The photosensors generating the binned chargers for summing or averaging may be filtered for the same color incident light, or different color incident light.

Pixel arrays configured to provide selective binning of floating diffusion regions, as shown in FIGS. 3 and 8, may be used to facilitate an improved window-of-interest averaging process. A window-of-interest averaging process is used to determine pixel value statistics for a window-of-interest within an image frame, the pixel value statistics then being used for various purposes. For example, CMOS imager cameras use an automatic exposure algorithm to automatically adjust exposure time (and gain) based on pixel value statistics. The statistics calculation is normally done in the digital domain and requires significant processing resources. However, by using the concept of programmatically connecting floating diffusion regions from pixel circuits in the imager, it is possible to move some or all steps of the window-of-interest averaging process into the analog domain, thus speeding up the process and saving overall power. An example of this window of interest process is now explained with reference to FIGS. 9A and 9B.

Figure 9A:
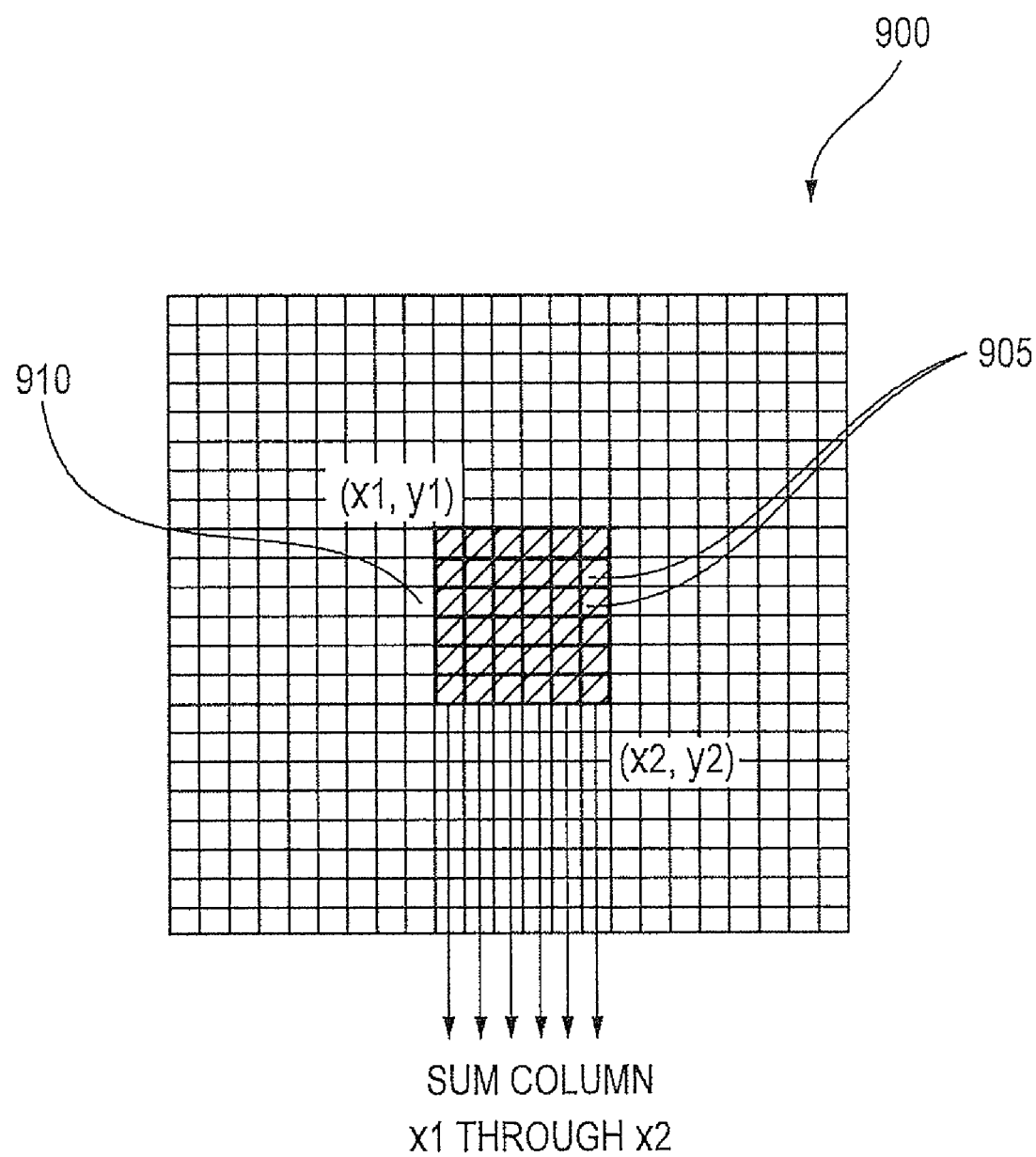
FIG. 9A is a block diagram of a pixel array, according to the disclosed embodiments.
Figure 9B:
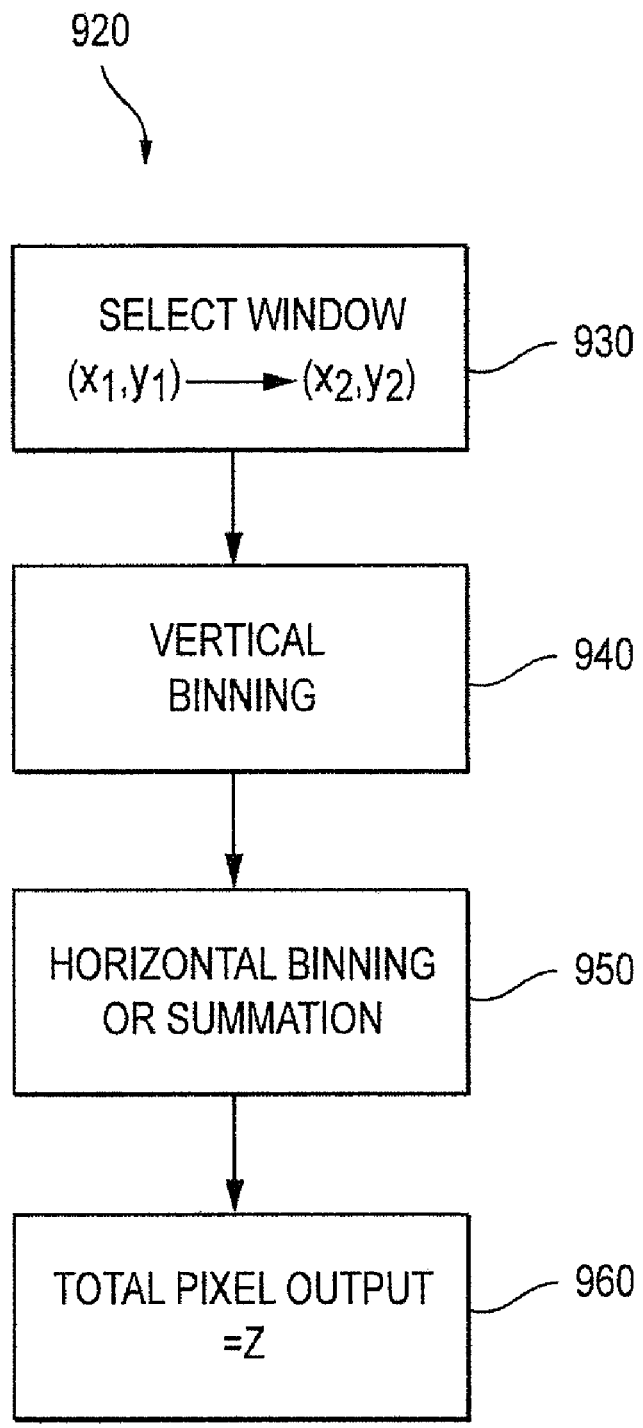
FIG. 9B is a flowchart of a window-of-interest averaging method, according to the disclosed embodiments.

FIG. 9A is a pixel array 900 with pixels 905 arranged in rows x and columns y. FIG. 9B is a flowchart illustrating the steps used in a method 920 to perform a window-of-interest averaging process. The pixels 905 in pixel array 900 are arranged in columns with adjacent floating diffusion regions configured to be switchably electrically connected via a reset transistor to provide vertical binning, as shown with regard to pixel array segments 300, 800 in FIGS. 3 and 8.

In order to determine pixel value statistics, a window 910 of pixels (indicated by hashing in pixels of the window) is selected, bounded by rows x1 and x2 and columns y1 and y2 (step 930). For each pixel 905 within the window 910, pixel outputs are binned by columns and read out (i.e., vertical binning is performed) (step 940). By utilizing the methods and apparatus described above to combine the floating diffusion regions associated with each respective pixel in each column of the window 910, vertical binning of y2−y1 number of floating diffusion regions is accomplished completely in the analog domain. After vertical binning, all column values are summed together either in the analog domain (i.e., via horizontal binning) or in the digital domain (step 950). The resulting value Z represents the sum of pixel circuit outputs for all pixels 905 inside the window 910 of interest (step 960).

The value Z may be divided by the total number of pixel circuits 905 within the window 910 to determine an average pixel circuit output for the window 910. Alternatively, if the dimensions of the window 910 are maintained the same, meaning that the number of pixel circuits within the window 910 is always the same, the value Z may be used without determining an average pixel circuit output. In an operation to optimize the integration time and gain of an imager, the integration time and gain of a camera system 1100 (FIG. 11) is adjusted to shift the value Z or the average pixel circuit output determined from the value Z to be closer to a target value.

Figure 10:
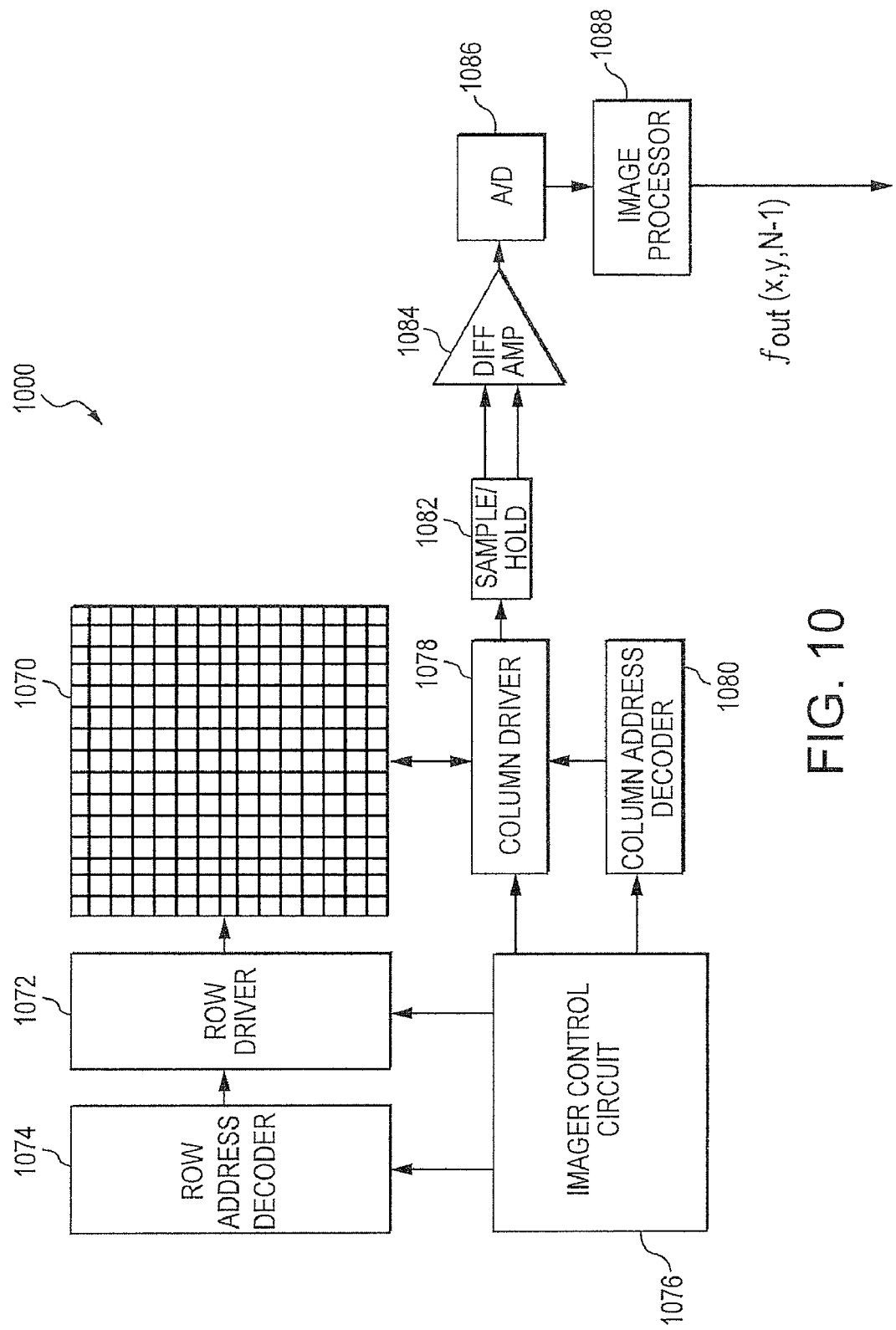
FIG. 10 is a block diagram of an imager, according to disclosed embodiments.

The configurations of FIGS. 3-8 and associated methods of use (including method 920) are implemented within an imager or imager system. FIG. 10 illustrates a block diagram of a CMOS imager 1000 having a pixel array 1070 including a plurality of pixels arranged in a predetermined number of columns and rows. The pixels in the pixel array 1070 are configured in accordance with any embodiment described above. Pixel values of pixel array 1070 are output row-by-row as activated by the control signals from row driver 1072 in response to a row address decoder 1074. Column driver 1078 and column address decoder 1080 are also used to selectively activate individual pixel columns. An imager control circuit 1076 controls the address decoders 1074, 1080 for selecting the appropriate row and column lines for pixel value readout. The control circuit 1076 also controls the row and column driver circuitry 1072, 1078 such that driving voltages may be applied.

The readout circuitry associated with each pixel outputs both a reset signal $V_{OPIX\_RST}$ and an image signal $V_{OPIX\_SIG}$, which are sampled, held and amplified by a sample and hold circuit 1082 according to a correlated double sampling ("CDS") scheme. The sample and hold circuit 1082 outputs amplified pixel reset and image signals $V_{OPIX\_RST}$, $V_{OPIX\_SIG}$. The difference $V_{OPIX\_DIFF}=(V_{OPIX\_RST}-V_{OPIX\_SIG})$ between $V_{OPIX\_RST}$ and $V_{OPIX\_SIG}$ represents the actual pixel output with common-mode noise eliminated. The differential signal $V_{OPIX\_DIFF}$ is produced by differential amplifier 1084 for each voltage read out from pixel array 1070. The differential signals are digitized by an analog-to-digital converter 1086. The analog-to-digital converter 1086 supplies the digitized pixel signals to an image processor 1088, which forms and outputs a digital image.

The imager 1000 and associated methods of use described above may be used in any system that employs a CMOS imager device, including, but not limited to a computer system, camera system, scanner, machine vision, vehicle navigation, video telephone, surveillance system, automatic focus system, star tracker system, motion detection system, image stabilization system, and other imaging systems. Example digital camera systems in which the above embodiments may be used include both still and video digital cameras, cellular telephone cameras, handheld personal digital assistant (PDA) cameras, and other types of cameras.

Figure 11:
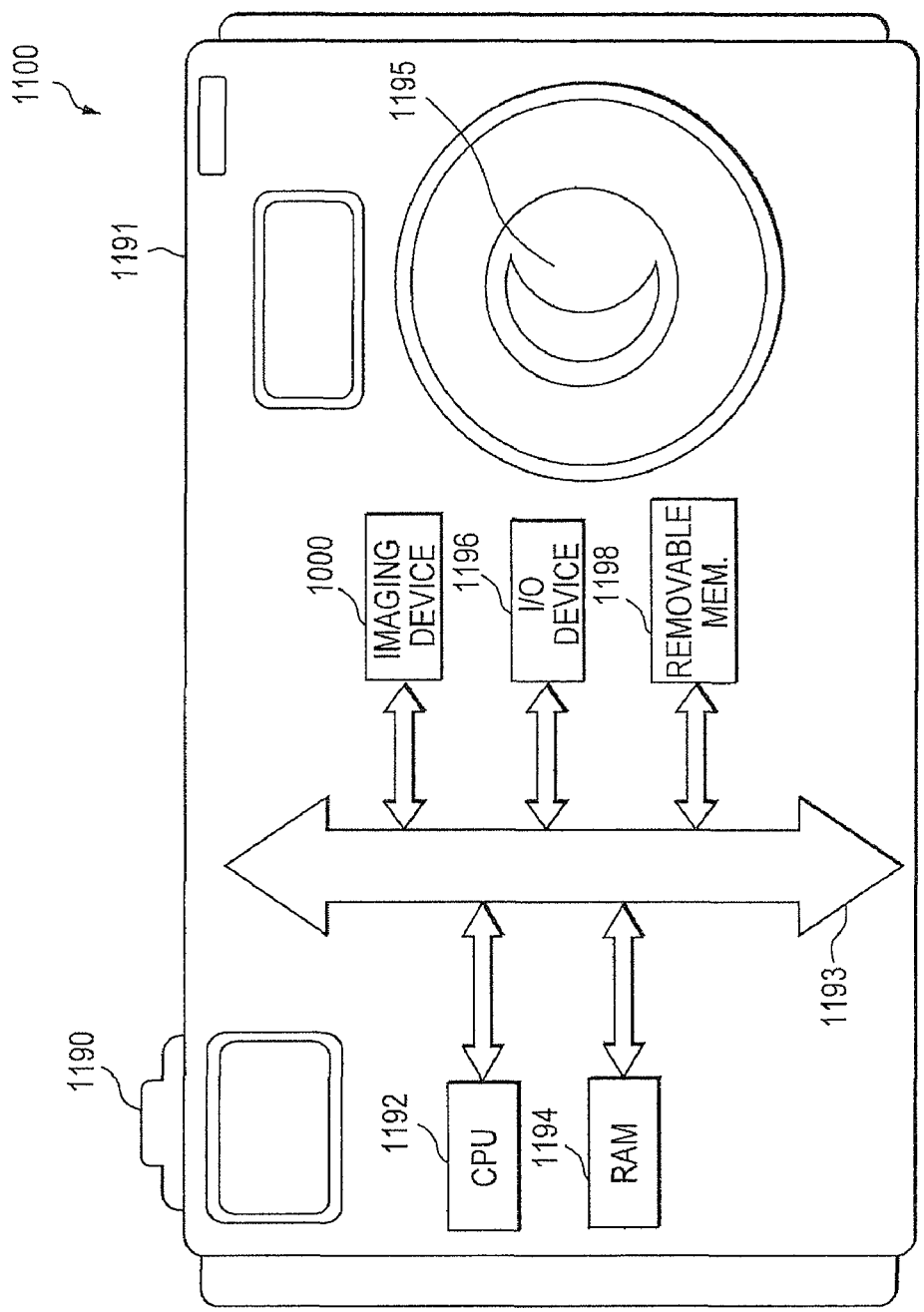
FIG. 11 is a block diagram of a camera system, according to disclosed embodiments.

FIG. 11 shows a typical system 1100, which is part of a digital camera 1191. The system 1100 includes imager 1000, which includes a pixel array having pixels configured to provide optional vertical binning, constructed as described above. System 1100 generally comprises a processing unit 1192, such as a microprocessor, that controls system functions and which communicates with an input/output (I/O) device 1196 over a bus 1193. Imager 1000 also communicates with the processing unit 1192 over the bus 1193. The system 1100 also includes random access memory (RAM) 1194, and can include removable memory 1198, such as flash memory, which also communicates with the processing unit 1192 via the bus 1193. Lens 1195 focuses an image on a pixel array 1070 of the imager 1000 when shutter release button 1190 is pressed.

The system 1100 could alternatively be part of a larger processing system, such as a computer. Through the bus 1193, the system 1100 illustratively communicates with other computer components, including but not limited to, a hard drive (not shown) and/or one or more removable media devices 1198. The imager 1000 may be combined with a processor, such as a central processing unit, digital signal processor, or microprocessor, with or without memory storage on a single integrated circuit or on a different chip than the processor.

The invention claimed is:

1. A pixel array comprising:
   a first pixel; and
   readout circuitry associated with the first pixel comprising:
   a first storage region for storing charge from the first pixel; and
   a first reset transistor for resetting the charge stored in the first storage region to a predetermined reset voltage, the first reset transistor being electrically connected between the first storage region and a second storage region associated with a second pixel when activated, wherein the first reset transistor has first and second terminals, wherein the first terminal is connected to the first storage region, wherein the second terminal is directly connected to the second storage region.

2. The pixel array of claim 1, wherein the first pixel is in a first row of pixels in the pixel array, and the second pixel is in a second row of pixels in the pixel array.

3. The pixel array of claim 2, wherein the first row of pixels is adjacent to the second row of pixels.

4. The pixel array of claim 2, wherein the first row of pixels is separated from the second row of pixels by at least one other row of pixels.

5. The pixel array of claim 1, wherein the first and second pixels are in a column of pixels in the pixel array.

6. The pixel array of claim 1, wherein at least one of the first and second storage regions is a floating diffusion region.

7. The pixel array of claim 1, wherein the first storage region is further electrically connected to a third storage region by a third reset transistor when activated.

8. The pixel array of claim 7, wherein at least one of the first, second, and third storage regions is a floating diffusion region.

9. The pixel array of claim 1, wherein at least one other pixel in the pixel array is configured to use the readout circuitry associated with the first pixel.

10. A pixel array comprising:
a first pixel; and
readout circuitry associated with the first pixel comprising:
a first storage region for storing charge from the first pixel; and
a first reset transistor for resetting the charge stored in the first storage region to a predetermined reset voltage, the first reset transistor being electrically connected between the first storage region and a second storage region associated with a second pixel when activated, wherein the first reset transistor is operated in accordance with a first reset signal configured to bin the first and second storage regions by activating the first reset transistor.

11. The pixel array of claim 10, wherein the first storage region is electrically connected to another adjacent storage region by another reset transistor operated in accordance with a respective other reset signal, and the first reset signal and the other reset signal are configured to deactivate the first reset transistor and the other reset transistor during a readout period of the first pixel.

12. The pixel array of claim 10, wherein the first and second storage regions are each electrically connected to adjacent storage regions by respective other reset transistors operated in accordance with respective other reset signals, wherein the other reset signals are configured to deactivate the other reset transistors during binning of the first and second storage regions.

13. A pixel array comprising:
a first pixel; and
readout circuitry associated with the first pixel comprising:
a first storage region for storing charge from the first pixel; and
a first reset transistor for resetting the charge stored in the first storage region to a predetermined reset voltage, the first reset transistor being electrically connected between the first storage region and a second storage region associated with a second pixel when activated, wherein the first storage region is further electrically connected to a third storage region by a third reset transistor when activated, wherein the first reset transistor is operated in accordance with a first reset signal, and the third reset transistor is operated in accordance with a third reset signal, the first reset signal and third reset signal being configured to bin the first, second, and third storage regions by activating the first and third reset transistors.

14. The pixel array of claim 13, wherein the second and third storage regions are each electrically connected to adjacent storage regions by respective other reset transistors operated in accordance with respective other reset signals, wherein the other reset signals are configured to deactivate the other reset transistors during binning of the first, second, and third storage regions.

15. A method of operating a pixel array comprising:
using a first reset transistor to reset a charge on a first storage region associated with a first pixel in the pixel array;
using the first reset transistor to bin the first storage region to a second storage region associated with a second pixel in the pixel array; and
transferring a charge from the first pixel to the binned storage regions.

16. The method of claim 15, further comprising:
transferring a charge from the second pixel to the binned storage regions.

17. The method of claim 16, further comprising:
summing the charges transferred to the binned storage regions by outputting the charges stored in the binned storage regions.

18. The method of claim 16, further comprising:
averaging the charges transferred to the binned storage regions by outputting the charge stored in one of the binned storage regions.

19. The method of claim 15, wherein binning the first and second storage regions varies a conversion gain of the first storage region, the method further comprising:
outputting the charge stored in the first storage region.

20. The method of claim 15, further comprising:
deactivating the first reset transistor after transferring the charge to the binned storage regions.

21. The method of claim 15, wherein at least one of the first and second storage regions is a floating diffusion region.

22. The method of claim 15, further comprising:
using a third reset transistor to reset a charge on a third storage region associated with a third pixel in the pixel array;
using the third reset transistor to bin the third storage region to the first and second storage regions.

23. The method of claim 22, further comprising:
transferring a charge from the second and third pixels to the binned storage regions.

24. The method of claim 22, further comprising:
summing the charges transferred to the binned storage regions by outputting the charges stored in the binned storage regions.

25. The method of claim 22, further comprising:
averaging the charges transferred to the binned storage regions by outputting the charge stored in one of the binned storage regions.

26. The method of claim 22, wherein binning the first, second, and third storage regions varies a conversion gain of the first storage region, the method further comprising:
outputting the charge stored in the first storage region.

27. The method of claim 22, further comprising:
deactivating the first and third reset transistors after transferring the charge to the binned storage regions.

28. The method of claim 22, wherein at least one of the first, second, and third storage regions is a floating diffusion region.

29. A method of operating an imager comprising a pixel array having a plurality of pixels, the method comprising:
electrically connecting floating diffusion regions associated with a column of pixels and resetting a charge stored in the electrically connected floating diffusion regions to a predetermined reset voltage by activating a plurality of reset transistors; and isolating a subset of the electrically connected floating diffusion regions by deactivating the reset transistors adjacent to the subset.

30. The method of claim 29, wherein the subset includes a plurality of floating diffusion regions.

31. The method of claim 29, wherein the subset includes a single floating diffusion region.

32. The method of claim 29, the method further comprising:
transferring charge to at least one of the subset of floating diffusion regions from the respective associated pixel.

33. The method of claim 32, further comprising:
deactivating the reset transistors electrically connecting each of the isolated floating diffusion regions in the subset after transferring the charge.

34. The method of claim 29, further comprising:
determining if a charge to be transferred from a pixel is above a predetermined charge threshold; and
configuring the floating diffusion regions included in the subset according to the determination.

35. The method of claim 34, wherein the subset includes the floating diffusion region associated with the pixel if the charge to be transferred is not above the predetermined threshold.

36. The method of claim 34, wherein the subset includes the floating diffusion region associated with the pixel and at least one more floating diffusion region if the charge to be transferred is above the predetermined threshold.

* * * * *